(12) United States Patent
Patsenker et al.

(10) Patent No.: US 7,984,515 B1
(45) Date of Patent: Jul. 19, 2011

(54) SOFTWARE LICENSE ENFORCEMENT BY RUNTIME FEATURE ENABLEMENT

(75) Inventors: Svetlana Patsenker, Wayland, MA (US); Boris Farizon, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 1145 days.

(21) Appl. No.: 11/731,468

(22) Filed: Mar. 30, 2007

(51) Int. Cl.
*G06F 7/04* (2006.01)
*G06F 17/00* (2006.01)
*G06F 21/00* (2006.01)
*H04N 7/16* (2011.01)
*G06F 9/445* (2006.01)
*G06F 15/177* (2006.01)

(52) U.S. Cl. .............. 726/31; 726/26; 707/3; 707/613; 705/59; 705/223

(58) Field of Classification Search .............. 726/31, 726/26; 707/613, 3; 705/59; 709/223
See application file for complete search history.

(56) References Cited

U.S. PATENT DOCUMENTS

| | | | |
|---|---|---|---|
| 6,188,995 B1 * | 2/2001 | Garst et al. | 705/59 |
| 7,140,042 B2 * | 11/2006 | Verma | 726/26 |
| 7,539,706 B1 * | 5/2009 | Campbell | 709/223 |
| 2007/0156659 A1 * | 7/2007 | Lim | 707/3 |

FOREIGN PATENT DOCUMENTS

WO WO 0205184 A2 * 1/2002

OTHER PUBLICATIONS

Atallah, M.J.; Jiangtao Li; "Enhanced smart-card based license management"; E-Commerce, 2003. CEC 2003. IEEE International Conference on Digital Object Identifier: 10.1109/COEC.2003.1210240, Publication Year: May 2003, pp. 111-119.*

* cited by examiner

*Primary Examiner* — Matthew B Smithers
*Assistant Examiner* — Courtney D Fields
(74) *Attorney, Agent, or Firm* — Krishnendu Gupta; Gerald P. Kazanjian (57) ABSTRACT

A storage area network (SAN) license validator manages data collection policies (DCPs) in deployed SAN agents by identifying data collection policies corresponding to unlicensed features, and disabling the DCPs for the unlicensed features. Thus, the agents need not expend computational and memory resources to gather data for unlicensed features that will not be queried. Agents receive a set of data collection policies (DCPs) for licensed features for which the corresponding data will be gathered and reported to the MODB. DCPs for unlicensed features are disabled in the agents that would have executed them, either by removing or canceling from an active DCP list or by omitting the unlicensed DCPs from the startup sequence of the agent. In this manner, agents operate with only the DCPs for licensed products and corresponding features, and need not gather extraneous data. Users do not observe a designated unavailable screen icon or selection, as unavailable data selections are simply omitted from the GUI display.

20 Claims, 7 Drawing Sheets

SOFTWARE LICENSE ENFORCEMENT BY RUNTIME FEATURE ENABLEMENT

BACKGROUND

In a storage area network (SAN), a SAN management application monitors and manages manageable entities in the SAN. The manageable entities include storage arrays, connectivity devices, and hosts. Typically, software components known as agents execute on the hosts for gathering, reporting, and monitoring the manageable entities in the SAN. The manageable entities are responsive to the agents for reporting various status metrics back to the agents and receiving control information from the agents. A management server executes the SAN management application, and oversees the agents. The management server is further responsive to a console having a graphical user interface (GUI) for receiving and displaying operator parameters with a SAN operator.

The agents periodically transmit management information to the management application. The management information pertains to performance and statistical data of the manageable entities that the agent is monitoring, and is employed to update and maintain a managed object database (MODB). The managed object database stores collective information on the manageable entities across the SAN for responding to queries from the management application. Such queries include available storage, used storage, configured and in-use devices, and frequency of usage, for example, and is employed to generate reports on trending analysis, current utilization, usage projections, and other reporting, accounting and maintenance operations.

The SAN management application invokes other sub-applications for performing various SAN operations, such as gathering and reporting statistical data in the SAN. The sub-applications are organized as products having features for providing the particular gathering, reporting or control functionality. SAN data gathering, processing, and reporting ranges from broadly characterized to highly detailed, depending on features desired by each particular SAN site (user organization). Certain users may not require or employ all particular features available via the SAN management application. Accordingly, SAN sub-applications, or products, are licensed to permit users to select licenses for products having desired features, and omit licenses for undesired features.

SUMMARY

A SAN management application monitors and manages hardware and software entities that comprise the storage area network. Typically these entities include storage arrays, connectivity devices such as routers and switches, and host computers (hosts) operable to execute agents for gathering, reporting, and controlling the SAN entities, collectively referred to as manageable entities. The level of scrutiny provided by the SAN management application is substantial, and is effected by multiple agents gathering, monitoring, and controlling manageable entities in the SAN. The management application is operable in conjunction with a variety of sub-applications, each of which provide various features for monitoring and managing the manageable entities. Each of the sub application, in turn, employs the agents for providing the features.

Typical features include gathering statistics about storage array performance, such as storage capacity used, allocated, available and free. The agents employ a set of data collection policies to identify the type and frequency of performance data to be gathered. Each DCP indicates a particular type or set of data to be gathered by the agent, and the frequency, or schedule, with which it is to be gathered (such as nightly). The gathered data is stored in a managed object database (MODB) for subsequent usage and querying by the management application. Each of the sub-applications, therefore, provides features by establishing and invoking an agent with a particular data collection policy (DCP).

In a large SAN, the quantity of performance data to be gathered can be substantial. Accordingly, certain users may not require all the types and quantity of data via all available features. As the sub-applications are licensed in conjunction with the management application, certain users may not desire licenses for sub-applications that provide unneeded features.

Since most users employ the available features, conventional SAN management applications deploy agents operable with all available data collection policies. Configurations herein are based, in part, on the observation that the conventional deployed agents gather available data from the manageable entities, and do not itemize licensed and unlicensed features, and thus may gather data inappropriate for the licenses in force, and report the data back to the MODB. Management of unlicensed features is provided because individual query views for unlicensed features, however, are disabled. The SAN operator (user) would observe a GUI screen with obscured or shaded icons for unlicensed features, thus preventing usage of the unlicensed features. Conventional SANs suffer from the shortcoming that agents continue to gather data corresponding to the unlicensed features, and suppress it only at the console, thus expending additional resources to gather data that will not be queried.

Accordingly, configurations herein substantially overcome the shortcomings of conventional, nonselective data gathering by the deployed agents by identifying data collection policies corresponding to unlicensed features, and disabling the data collection polices for the agents having the unlicensed DCPs. In this manner, the agents need not expend computational and memory resources to gather data for unlicensed features that will not be queried. Agents receive a set of data collection policies (DCPs) for licensed features for which the corresponding data will be gathered and reported to the MODB. DCPs for unlicensed features are disabled in the agents that would have executed them, either by removing or canceling from an active DCP list or by omitting the unlicensed DCPs from the startup sequence of the agent. In this manner, agents operate with only the DCPs for licensed products and corresponding features, and need not gather extraneous data. Further, users do not observe a designated unavailable screen icon or selection, as unavailable data selections are simply omitted from the GUI display.

In further detail, the method of enforcing software licenses in a storage area network (SAN) by enablement and disablement of data collection policies (DCPs) includes deploying a set of software products in the storage area network, and identifying data collection policies (DCPs) associated with each of the deployed software products. A license validator determines existence of a license for each of a set of software products, and disables, for each unlicensed software product, the data collection policies (DCPs) associated with the unlicensed product.

Disabling the DCPs further includes updating a master DCP list in a server database, and disseminating the updated DCP list to each of a set of agents operable with the unlicensed software products. The deployed software products include SAN agents, such that the agents are operable to collect data according to the data collection policies. At startup, the management application sends the corresponding data collection policies to the agent, such that the agent is responsive to the DCP for periodically transmitting statistical data back to the server, and omits or disables DCPs for software products marked as unlicensed in the master DCP list.

Each of the software products has one or more features. The management application defines, for each of the features, a DCP operable to provide the identified feature. The license validator identifies, for each of the unlicensed software products, DCPs defined to provide features of the unlicensed software product, and disables the identified DCPs in the agents corresponding to the identified DCPs, such that the agents do not gather data corresponding to unlicensed software products.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In a storage area network, conventional SAN management applications typically deploy agents operable with a set of available data collection policies. Configurations herein are based, in part, on the observation that the deployed agents may gather all available data from the manageable entities, without regard to licensed features, and report the data back to a managed object database (MODB). Conventional SANs therefore suffer from the shortcoming that agents continue to gather data corresponding to the unlicensed features, and suppress it only at the console by disabling certain unlicensed views, thus expending additional resources to gather data that may not be queried. Accordingly, configurations herein substantially overcome the shortcomings of conventional, non-selective data gathering by the deployed agents by identifying data collection policies corresponding to unlicensed features, and disabling the DCPs for the unlicensed features. Thus, the agents need not expend computational and memory resources to gather data for unlicensed features that will not be queried.

Agents receive a set of data collection policies (DCPs) for licensed features for which the corresponding data will be gathered and reported to the MODB. DCPs for unlicensed features are disabled in the agents that would have executed them, either by removing or canceling from an active DCP list or by omitting the unlicensed DCPs from the startup sequence of the agent. In this manner, agents operate with only the DCPs for licensed products and corresponding features, and need not gather extraneous data. Further, uses do not observe a designated unavailable screen icon or selection that suggests the unlicensed features, as unavailable data selections are simply omitted from the GUI display.

Figure 1:
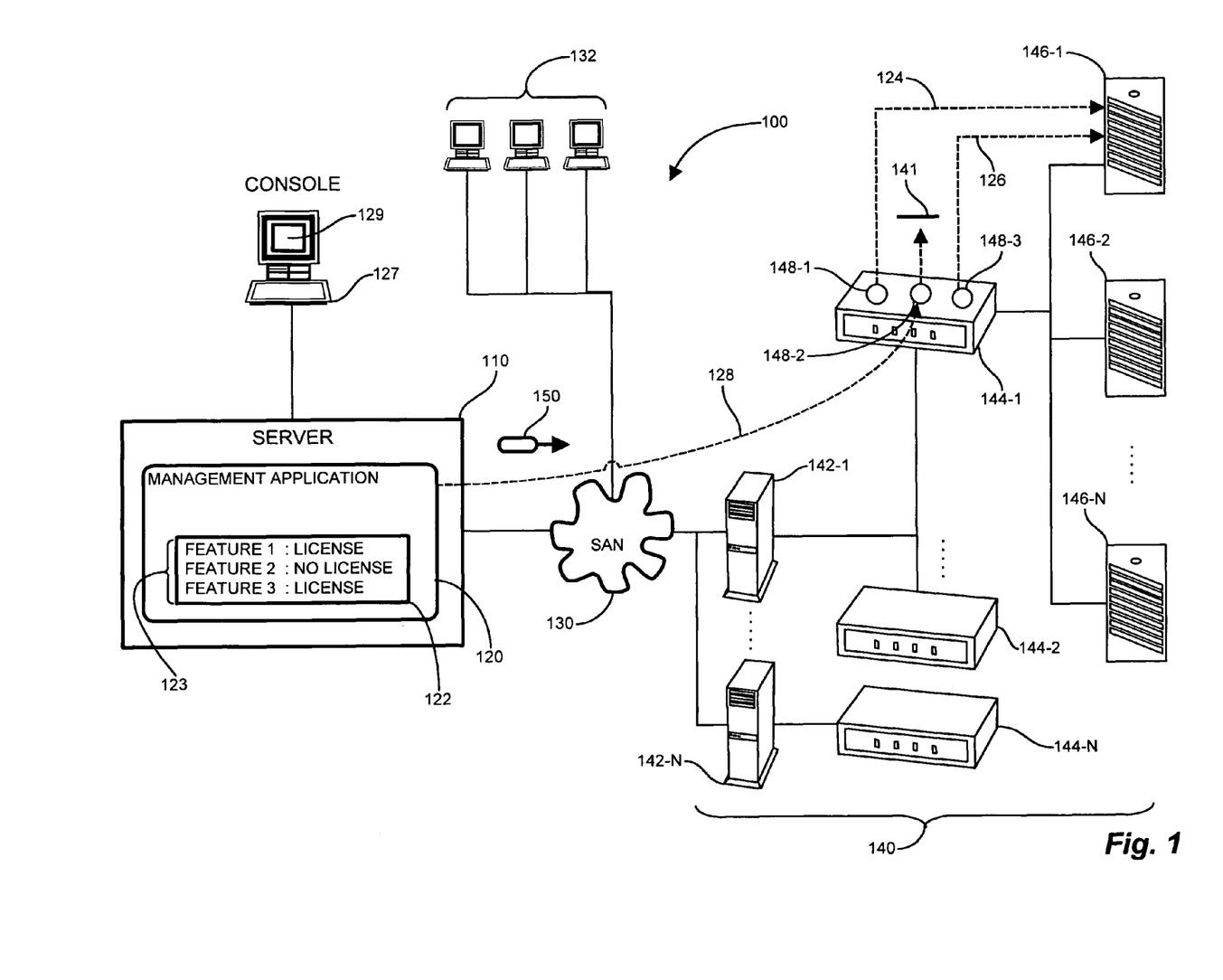
FIG. 1 is a context diagram of an exemplary managed information environment suitable for use with the present invention.

FIG. 1 is a context diagram of an exemplary managed information environment suitable for use with the present invention. Referring to FIG. 1, the managed information environment 100 includes a server 110 executing a management application 120 coupled to a storage area network (SAN) interconnection 130. The management application 120 is responsive to a console 127 via a graphical user interface 129 operable to issue commands and receive operator feedback. The SAN interconnection 130 couples the server to SAN nodes 140, including connectivity devices 142-1 . . . 142-N (142 generally), hosts 144-1 . . . 144-N (144 generally) and storage arrays 146-1 . . . 146-N (146 generally). Each of the hosts 144 further includes one or more agents 148-1 . . . 148-3 (148 generally). The agents 148 communicate with the storage arrays 146 to monitor and manage the storage arrays, such as collecting statistical data for queries and reports from the management application 120. The management application 120 includes licensing information 122 organized according to features 123. Each of the agents 148 supports one or more features 123 of the management application 120.

The agents 148 provide the features 123 based on a data collection policy (DCP), which is an indication of frequency, nodes, and types of data that the agent 148 collects and returns to the management application 120. The features 123 therefore each support particular report and query capabilities performable via the management application 120 from the console 127. The features 123 are typically organized by software sub-applications, or products, which are activated by a license. Each product enables one or more features 123. The licensing information 122 in the management application 120 identifies which features 123 are licensed. In the configuration in FIG. 1, agents 148-1 and 148-3 collect data from storage array 146-1 to satisfy licensed feature 1 and feature 3, as shown by arrows 124 and 126. The management application 120, however, sends a disable message 150 (arrow 128) to agent 148-2, otherwise responsible for data collection satisfying feature 2, because feature 2 is unlicensed. Accordingly, agent 148-2 is suppressed from gathering feature 2 data from storage array 146-1, shown by truncated arrow 141.

During operation, the managed information environment 100 provides data storage and retrieval services to a user community 132 via the SAN interconnection 130. Typically, data stored in the storage arrays 146 is read, written and updated by requests from the user community 132 via the SAN interconnection 130.

Figure 2:
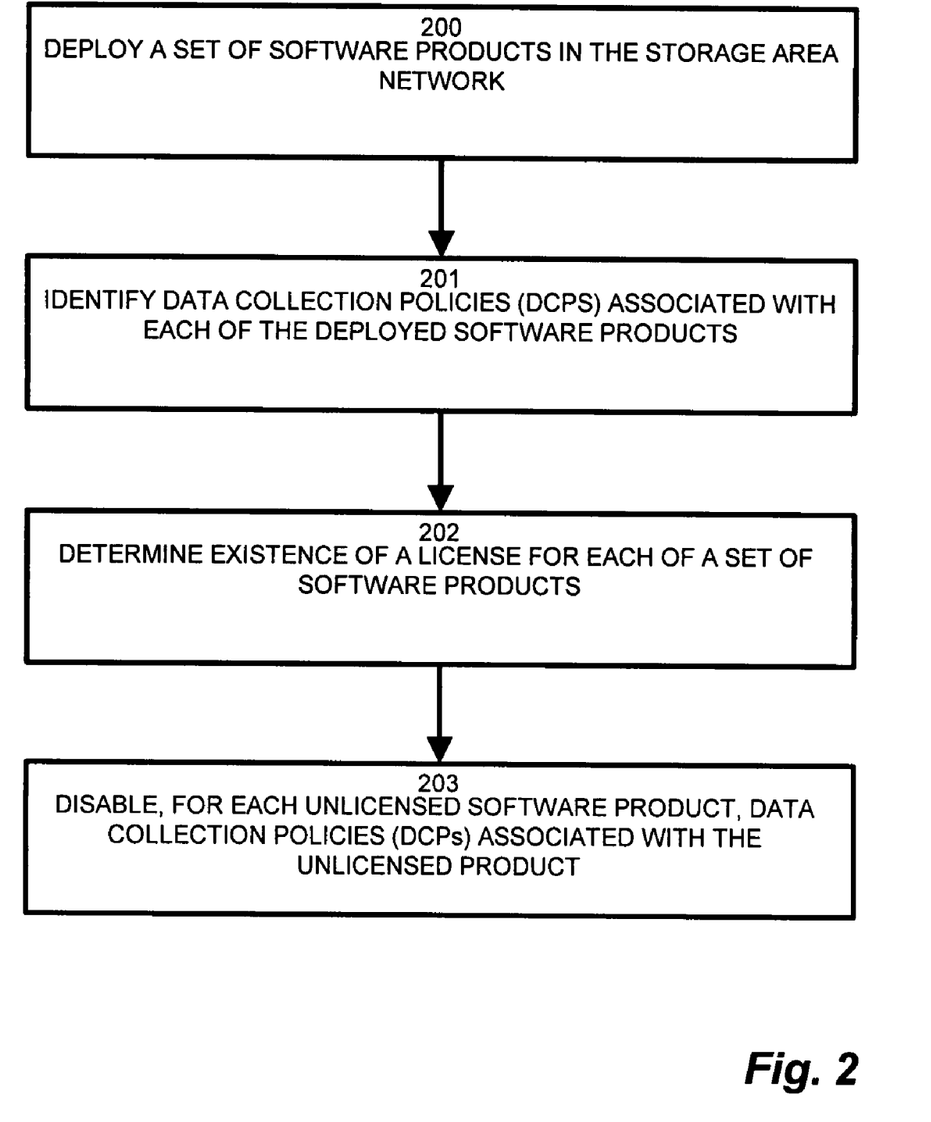
FIG. 2 is a flowchart of licensed product enabling in the environment of FIG. 1.

FIG. 2 is a flowchart of licensed software product enabling in the environment of FIG. 1. Referring to FIGS. 1 and 2, the method of enforcing software licenses in a storage area network (SAN) includes, at step 200, deploying a set of software products in the storage area network 100, and identifying data collection policies (DCPs) associated with each of the deployed software products represented by agents 148, as depicted at step 201. The management application 120 employs licensing information 122 to determine existence of a license for each of a set of software products 123, as shown at step 202, and disables, for each unlicensed software product, data collection policies (DCPs) associated with the unlicensed product 123, as disclosed at step 203. Typically, all DCPs associated with the unlicensed product are disabled.

Figure 3:
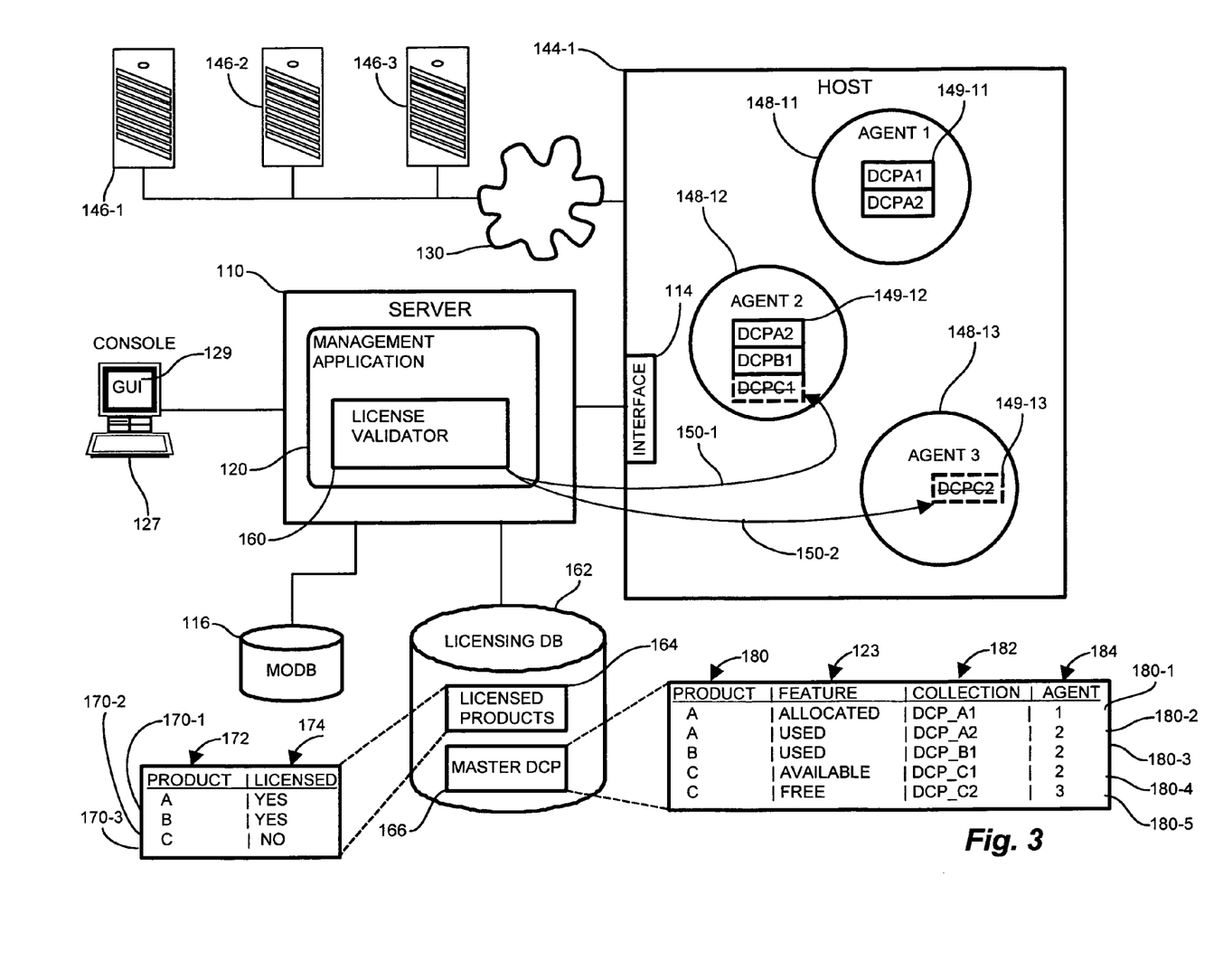
FIG. 3 is an example of disabling unlicensed software products in the environment of FIG. 1.
Figure 4:
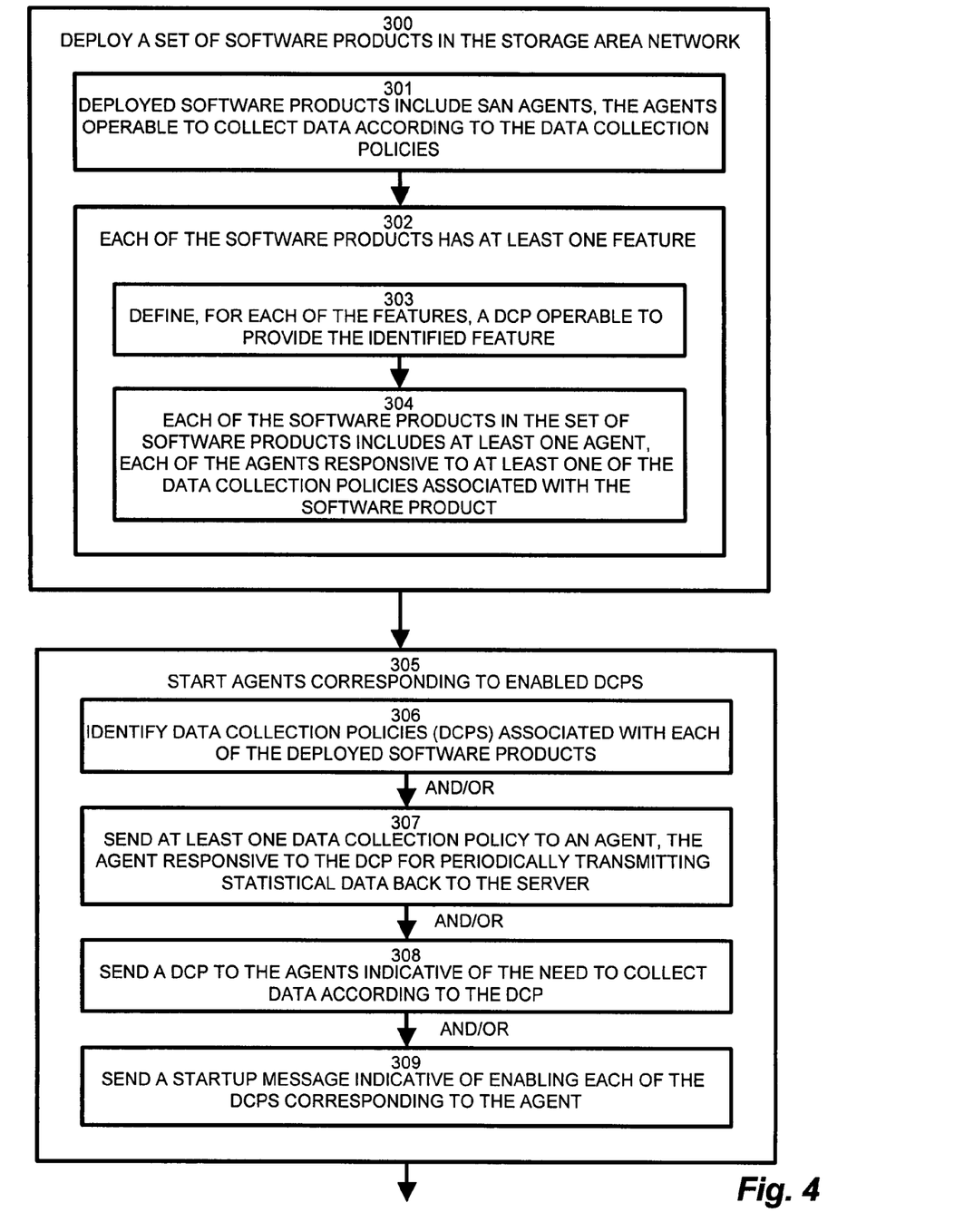
FIGS. 4-7 are a flowchart of selective license enabling for software products in a SAN in the system in FIG. 3.
Figure 5:
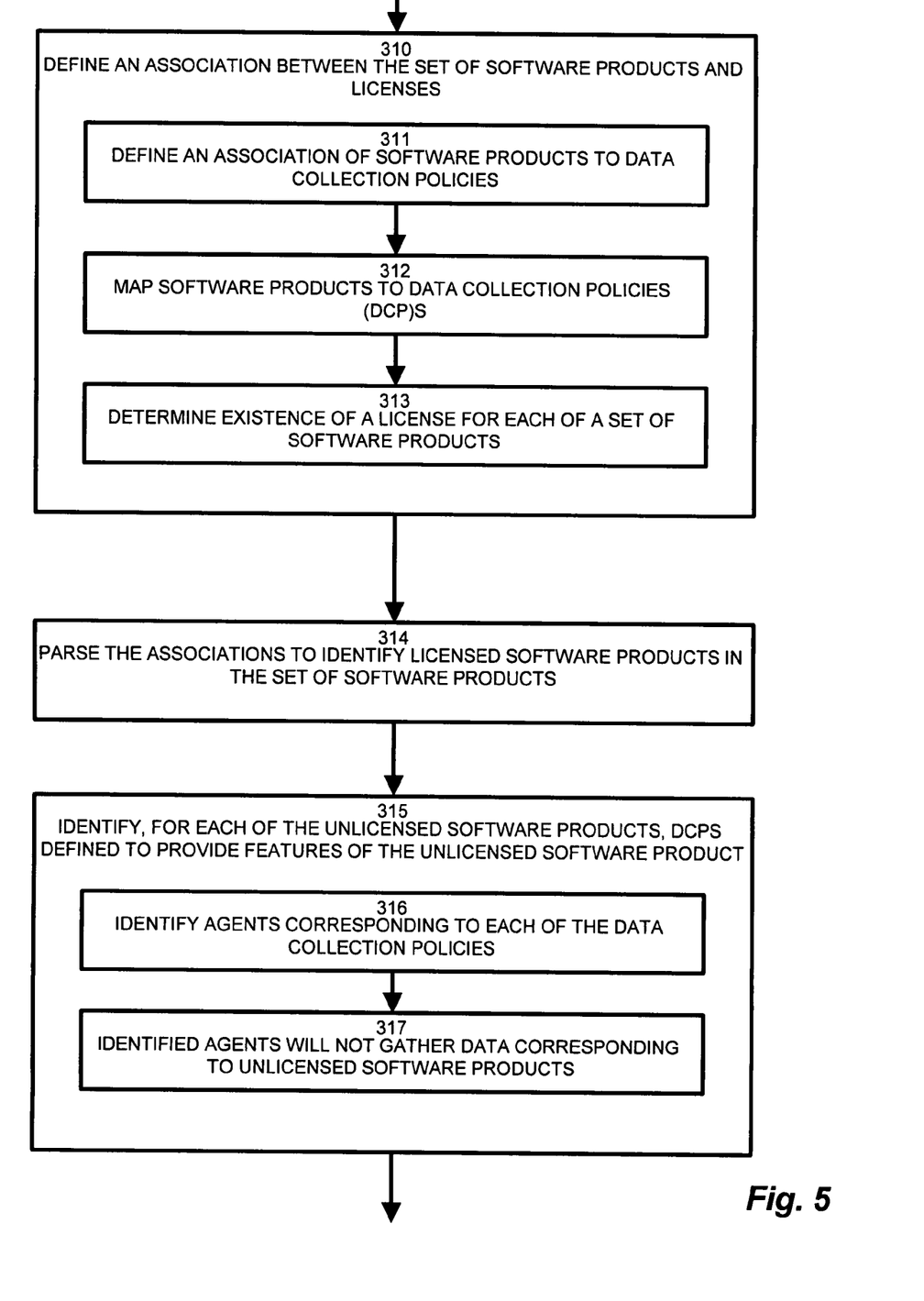
Figure 6:
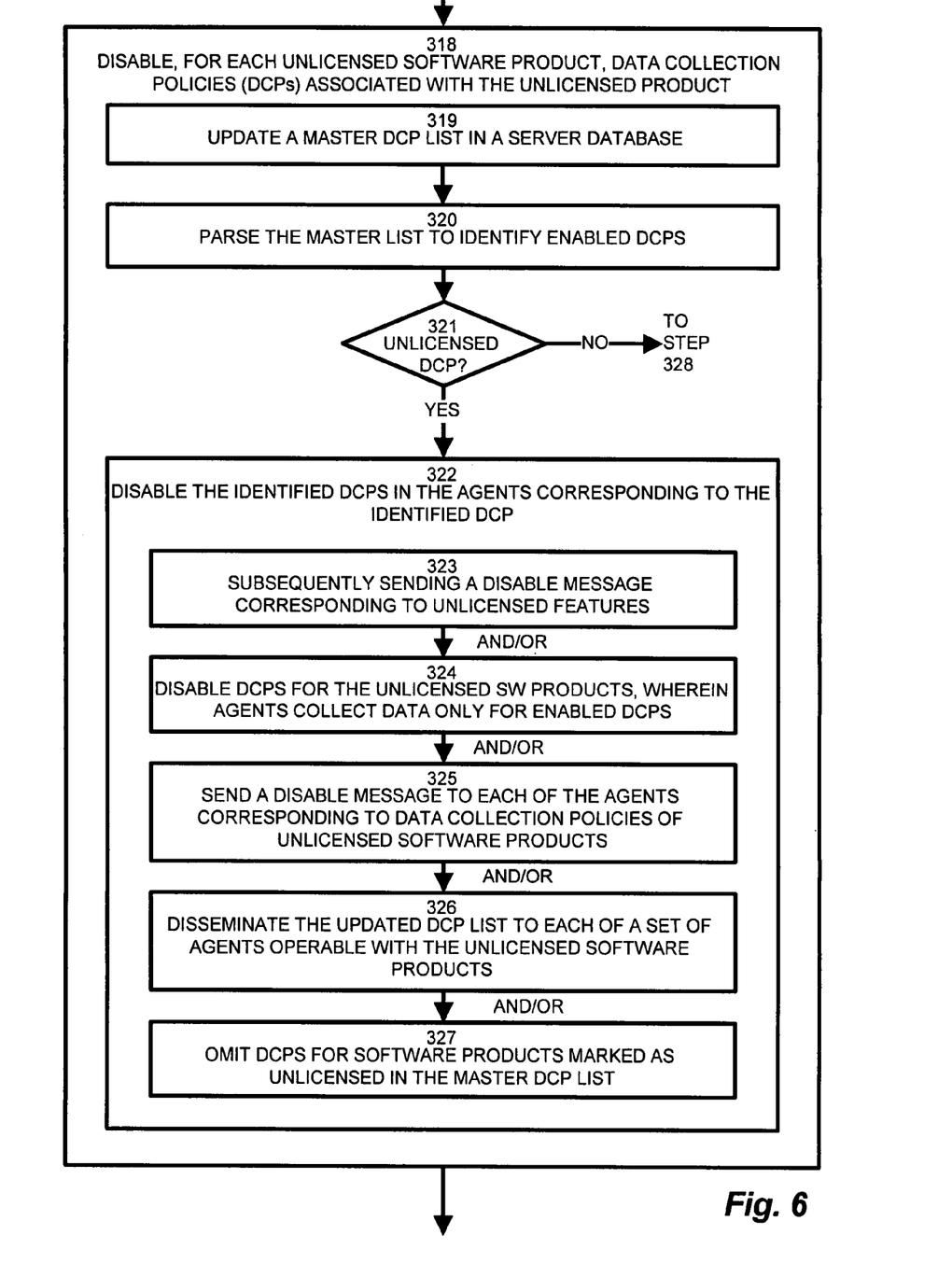
Figure 7:
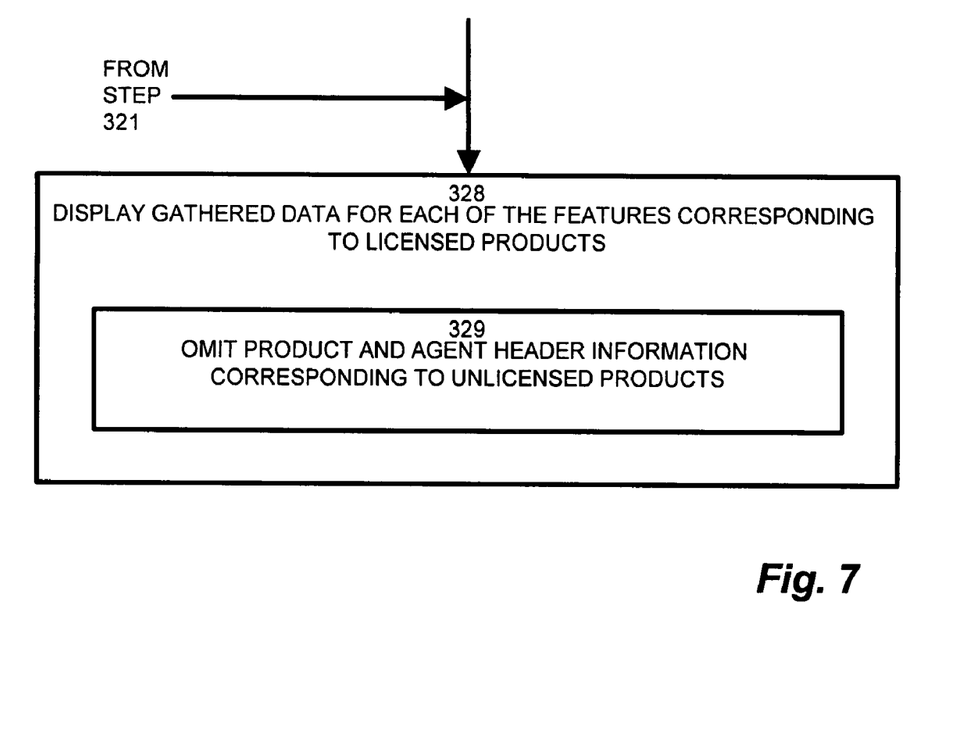

FIG. 3 is an example is disabling unlicensed software products in the environment of FIG. 1. Referring to FIGS. 1-3, the licensing information 122 takes the form of a license validator 160 in communication with a licensing database 162. The licensing database includes a table of licensed products 164 and a master data collection policy table 166 listing features 123 in each of the products. The products table 164 includes license entries 170-1 . . . 170-3 (170 generally) that specifies products 172 and license status 174. The master DCP table 166 includes a set of feature entries 180-1 . . . 180-5 (180 generally) that correlates each of the products 180 to included features 123 and the data collection policy 182 and agent 184 responsible for performing the data collection policy. As indicated above, the information collected via the DCP 182 is stored in a repository such as a managed object database (MODB) 116 for querying and reporting by the management application 120.

In FIG. 3, an exemplary enable/disable sequence is disclosed. Such a sequence typically occurs during agent 148 deployment and startup, however may occur at any suitable time. The server 110 deploys software products 180 A, B and C via interface 114, based on the DCP table 166. The master DCP table 166, or list, includes feature entries 180-N for each feature 123 provided by a product 180. On the exemplary host 144-1, the management application 120 deploys three agents 148-11 (agent 1), 148-12 (agent 2) and 148-3 (agent 3) for implementing DCPs 182 called for by the software products 172. The master DCP table 166 indicates that product A provides features 123 for allocated and used storage space, and uses data collection policies 182 A1 and A2 (DCP_A1, DCP_A2) via agent 1 and 2 respectively, shown by feature entry 180-1 and 180-2. Similarly, product B provides a used storage space feature via DCP_B1 on agent 2, shown by entry 180-3, and product C provides features for available and free space via DCP_C1 and DCP_C2 on agents 2 and 3, respectively (entries 180-4, 180-5).

Each agent 148 includes a data collection policy list 149-11 . . . 149-13 respectively, having the enabled DCPs to be implemented by the agent 148. During startup, each agent 148 receives an initial DCP list 149 with the DCPs corresponding to available software products. The license validator 160, as will now be described, verifies each of the licenses from the licensing table entries 170-N, identifies unlicensed features, and sends a disable message 150 to agents 148 having unlicensed DCPs in their DCP list 149. Alternatively, the validator 160 operates before the agent 148 startup and starts the agents with only DCPs for licensed products. Other sequences of agent startup, license validation and DCP enablement/disablement will be apparent.

Returning to the license validator 160, the validator 160 parses the licensed products table 164 and determines that product C is not licensed, as shown by license entry 170-3. the license validator 160 parses the master DCP list to identify software product features 123 corresponding to product C, and the DCPs 182 providing them.

From feature entries 180-4 and 180-5, the license validator 160 determines that agent 2 148-12 provides DCP_C1, and agent 3 148-13 provides DCP_C2. Accordingly, the license validator 160 sends disable messages 150-1 and 150-2 to disable data collection policies DCP_C1 and DCP_C2 from the respective DCP lists 149-12 and 149-13.

FIGS. 4-7 are a flowchart of selective license enabling for software products 180 in a SAN in the system in FIG. 3. Referring to FIGS. 3-7 method of enforcing software licenses in the storage area network (SAN) environment 100 as shown and described herein includes, at step 300, deploying a set of software products 180 in the storage area network. In the example arrangement, the deployed software products 180 include SAN agents 148, such that the agents 148 are operable to collect data according to the data collection policies 182, as depicted at step 301. Each of the deployed software products 172 has at least one feature 123, as shown at step 302, thus the management application 120 defines, in a master DCP list 166, for each of the features 123, a DCP 182 operable to provide the identified feature 123, as shown at step 303. Each of the software products 180 in the set of software products 170 includes at least one agent 148, in which each of the agents 148 is responsive to at least one of the data collection policies 182 associated with the software product 180; as depicted at step 304.

The management application 120 starts the agents corresponding to the DCPs 182 from the master DCP list 166, as disclosed at step 305. This includes identifying data collection policies (DCPs) 182 associated with each of the deployed software products 180, as depicted at step 306, and sending the data collection policies 182 to the agents 148, in which each agent 148 is responsive to the DCP 182 for periodically transmitting statistical data back to the server 120, as disclosed at step 307. The agents 148 typically employ multiple DCPs 182, each corresponding to a respective feature 123 of the deployed software products 180. The association of agents 184 to DCPs 182 and features 123 may vary based on the number of hosts 144 and storage arrays 146, the number of agents 148 deployed, and the number of software products 180. Other factors such as load balancing may contribute. The server 110 sends one or more DCPs 182 to the agents 148 indicative of the need to collect data according to the DCP 182, typically in the form of a DCP list 149 as depicted at step 308. The management application sends 120 a startup message indicative of enabling each of the DCPs 182 corresponding to the agent 148, as shown at step 309. Typically, the DCPs are sent only initially, at agent 148 startup, although they could be modified or superceded. Note that the DCPs and startup message may be the same transmission.

The license validator 160 receives or defines an association between the set of software products and licenses, such as the licensed products table 164, as shown at step 310, to identify the DCPs 182 that should be enabled based on licensed products. The license validator 160 then identifies or defines an association of software products to data collection policies, such as the master DCP, as shown at step 311. The license validator 312 maps the software products 180 to the data collection policies (DCP)s 182, as depicted at step 312, and determining existence of a license for each of a set of software products from the license status 313 for each of the DCPs, as disclosed at step 313.

Having identified the associations in the tables 164, 166, the license validator 160 parsing the associations to identify licensed software products in the set of software products 180, as depicted at step 314. Accordingly, the license validator 160 identifies, for each of the unlicensed software products 123, DCPs 182 defined to provide features 123 of the unlicensed software product 174, as disclosed at step 315. From the master DCP table 166, the licensed validator 160 identifies the agents 184 corresponding to each of the data collection policies 182, as depicted at step 316, such that the agents 148 will not gather data corresponding to unlicensed software products 174, as depicted at step 317.

The license validator 160 disables, for each unlicensed software product 180, at least one data collection policy (DCP) 182 associated with the unlicensed software product 180, as shown at step 318. In the example configuration shown, disabling further includes updating the master DCP list 166 in the server licensing database 162, and parsing the master list 166 to identify enabled DCPs 182, as shown at step 320. The license validator 160 correlates each parsed feature entry 180, which corresponds to a DCP 182 and a product 180, with the product field 172 in the licensed products table 164 to determine if the feature 123 is licensed, based on the corresponding licensed field 174 in the license entry 170. A check is performed, at step 321, to identify unlicensed features, and the license validator 160 disables the identified DCPs in the agents 148 corresponding to the identified DCP 182, as depicted at step 322. This includes subsequently sending a disable message 150 corresponding to unlicensed features 123, as depicted at step 323, thus disabling DCPs 182 in the DCP lists 149 for the unlicensed SW products 180, such that the agents 148 collect data only for enabled DCPs 182, as shown at step 324. Thus, the license validator 160 sends a disable message 150 to each of the agents 148 corresponding to data collection policies 182 of unlicensed software products 180, as depicted at step 325

In particular configurations, the license validator 160 may disseminate the updated DCP list 166 and licensing product information 164 to each of a set of agents 148-N operable with the unlicensed software products 180, as depicted at step 326, or may omit DCPs 182 for software products 180 marked as unlicensed 174 in the master DCP list 166, as depicted at step 327. As indicated above, the sequence of enablement and disablement of DCPs may vary from a startup state to an operational state depending on the order of operation of the license validator 160. The DCPs 182 corresponding to the unlicensed software products 180 are marked as disabled so as to not operate to collect data, as shown by strikethrough DCPs DCP_C4 and DCP_C5 in agent 148 DCP lists 149-12 and 149-13, respectively.

The console 127 may be employed by an operator to issue a query regarding licensed product status, and accordingly, the console GUI 129 displays gathered data for each of the features 123 corresponding to licensed products 180, as depicted at step 328 and omits product 172 and agent 148 header information corresponding to unlicensed products 174, as depicted at step 329, thus avoiding alternate views which display features of unlicensed products in a highlighted or partially obscured manner to indicate their dormant state.

Those skilled in the art should readily appreciate that the programs and methods for license validation and enforcement via DCP enablement as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. Such delivery may be in the form of a computer program product having a computer readable medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for license validation and enforcement via DCP enablement has been particularly shown and described with references to embodiments thereof, it will be understood by those skilled in the art that various changes in form and details may be made therein without departing from the scope of the invention encompassed by the appended claims.

What is claimed is:

1. A method of enforcing software licenses on storage area network (SAN) entities by a computerized device coupled to the storage area network, the method comprising:
    deploying a set of software products to the storage area network entities in the storage area network, each software product in the set of software products having one or more features for which a license may be obtained;
    identifying data collection policies (DCPs) associated with the features of each of the deployed software products in the set of software products for collection of data from the storage area network entities;
    determining existence of a license for each of the features of each of the deployed software products in the set of software products deployed to the storage area network entities; and
    disabling, for each unlicensed feature of each software product of the set of software products deployed to the storage area network entities, at least one data collection policy (DCP) associated with the unlicensed feature.

2. The method of claim 1 wherein disabling further comprises:
    updating a master DCP list in a server database; and
    disseminating the updated DCP list to each of a set of agents operable with the unlicensed software products.

3. The method of claim 2 wherein the deployed software products include SAN agents, the agents operable to collect data according to the data collection policies, further comprising:
    sending at least one data collection policy to an agent, the agent responsive to the DCP for periodically transmitting statistical data back to the server; and
    omitting DCPs for software products marked as unlicensed in the master DCP list.

4. The method of claim 3 wherein the agents do not gather data corresponding to unlicensed software products.

5. The method of claim 4 further comprising:
    displaying gathered data for each of the features corresponding to licensed products; and omitting product and agent header information corresponding to unlicensed products.

6. The method of claim 1 wherein each of the software products in the set of software products includes at least one agent, each of the agents responsive to at least one of the data collection policies associated with the software product.

7. The method of claim 6 wherein each of the software products has at least one feature, further comprising:
defining, for each of the features, a DCP operable to provide the identified feature;
identifying, for each of the unlicensed software products, DCPs defined to provide features of the unlicensed software product; and
disabling the identified DCPs in the agents corresponding to the identified DCPs.

8. The method of claim 7 further comprising:
defining an association between the set of software products and licenses, and
parsing the associations to identify licensed software products in the set of software products.

9. The method of claim 2 further comprising:
mapping software products to data collection policies (DCP)s; and
disabling DCPs for the unlicensed software products, wherein agents collect data only for enabled DCPs.

10. The method of claim 9 further comprising:
defining an association of licenses to software products;
defining an association of software products to data collection policies;
identifying agents corresponding to each of the data collection policies; and
sending a disable message to each of the agents corresponding to data collection policies of unlicensed software products.

11. The method of claim 2 further comprising:
parsing the master list to identify enabled DCPs;
starting agents corresponding to enabled DCPs; and
sending a DCP to the agents indicative of the need to collect data according to the DCP.

12. A storage area network (SAN) management server for enforcing software licenses in a storage area network, the server comprising:
a memory;
a processor;
an interface operable to deploy a set of software products in the storage area network; and
an interconnection mechanism coupling the memory, the processor and the interface;
wherein the memory is encoded with a software license enforcement application that, when executed on the processor, operable to:
identify a set of data collection policies (DCPs) at the storage area network entities associated with each of the deployed software products, each of the software products in the set of software products including at least one agent, each of the agents responsive to at least one of the data collection policies associated with the software product;
determine existence of a license for each of a set of software products; and
disable, for each unlicensed software product, at least one data collection policy (DCP) in the deployed software products associated with the unlicensed product.

13. The server of claim 12 further comprising a licensing database having a master DCP list, wherein the software license enforcement application is further operable to:
update a master DCP list in the licensing database; and
disseminate the updated DCP list to each of a set of agents operable with the unlicensed software products.

14. The server of claim 11 wherein the deployed software products include SAN agents, the agents operable to collect data according to the data collection policies, wherein the software license enforcement application is further operable to:
send at least one data collection policy to an agent, the agent responsive to the DCP for periodically transmitting statistical data back to the server; and
omit DCPs for software products marked as unlicensed in the master DCP list, wherein the agents do not gather data corresponding to unlicensed software products.

15. The server of claim 14 further comprising a graphical user interface (GUI) responsive to the software license enforcement application, the GUI operable to:
display gathered data for each of the features corresponding to licensed products; and
omit product and agent header information corresponding to unlicensed products.

16. The server of claim 12 wherein the master DCP list further includes features, wherein each of the software products has at least one feature, the master DCP list operable to define, for each of the features, a DCP operable to provide the identified feature, wherein the software license enforcement application is further operable to:
identify, for each of the unlicensed software products, DCPs defined to provide features of the unlicensed software product; and
disable the identified DCPs.

17. The server of claim 16 wherein the memory is encoded with
a table of licensed products operable to define an association between the set of software products and licenses, wherein the software license enforcement application is further operable to:
parse the associations to identify licensed software products in the set of software products
map licensed software products to data collection policies (DCP)s; and
disable DCPs for the unlicensed software products, wherein agents collect data only for enabled DCPs.

18. The server of claim 14 wherein the software license enforcement application is further operable to:
identify an association of licenses to software products;
identify an association of software products to data collection policies;
identify agents corresponding to each of the data collection policies; and
send a disable message to each of the agents corresponding to data collection policies of unlicensed software products.

19. A computer program product having computer program code including set of processor based instructions encoded on a non-transitory computer readable storage medium for enforcing software licenses in a storage area network (SAN) comprising:
computer program code for deploying a set of software products in the storage area network;
computer program code for identifying data collection policies (DCPs) associated with each of the deployed software products, the deployed software products include SAN agents, the agents operable to collect data according to the data collection policies;

computer program code for sending at least one data collection policy to each of the agents, the agent responsive to the DCP for periodically transmitting statistical data back to the server;

computer program code for sending a startup message indicative of enabling each of the DCPs corresponding to the agent;

computer program code for determining existence of a license for each of the software products in the set of software products;

computer program code for updating, based on the determining, a master DCP list in a server database, each of the software products having at least one feature, the master DCP list operable to define, for each of the features, a DCP operable to provide the identified feature;

computer program code for identifying, for each of the unlicensed software products, DCPs defined to provide features of the unlicensed software product; and computer program code for disabling, for each unlicensed software product, at least one data collection policy (DCP) associated with the unlicensed product by subsequently sending a disable message corresponding to unlicensed features.

20. The method of claim 1 further comprising collecting data from only licensed software products of the set of software products deployed to the storage area network entities as determined by data collection policies associated with the software products to limit data collected by the storage area network entities for output to a server, wherein updating a master DCP list in a server database includes updating entries in the master DCP list for each disable data collection policy.

* * * * *